UNITED STATES PATENT OFFICE.

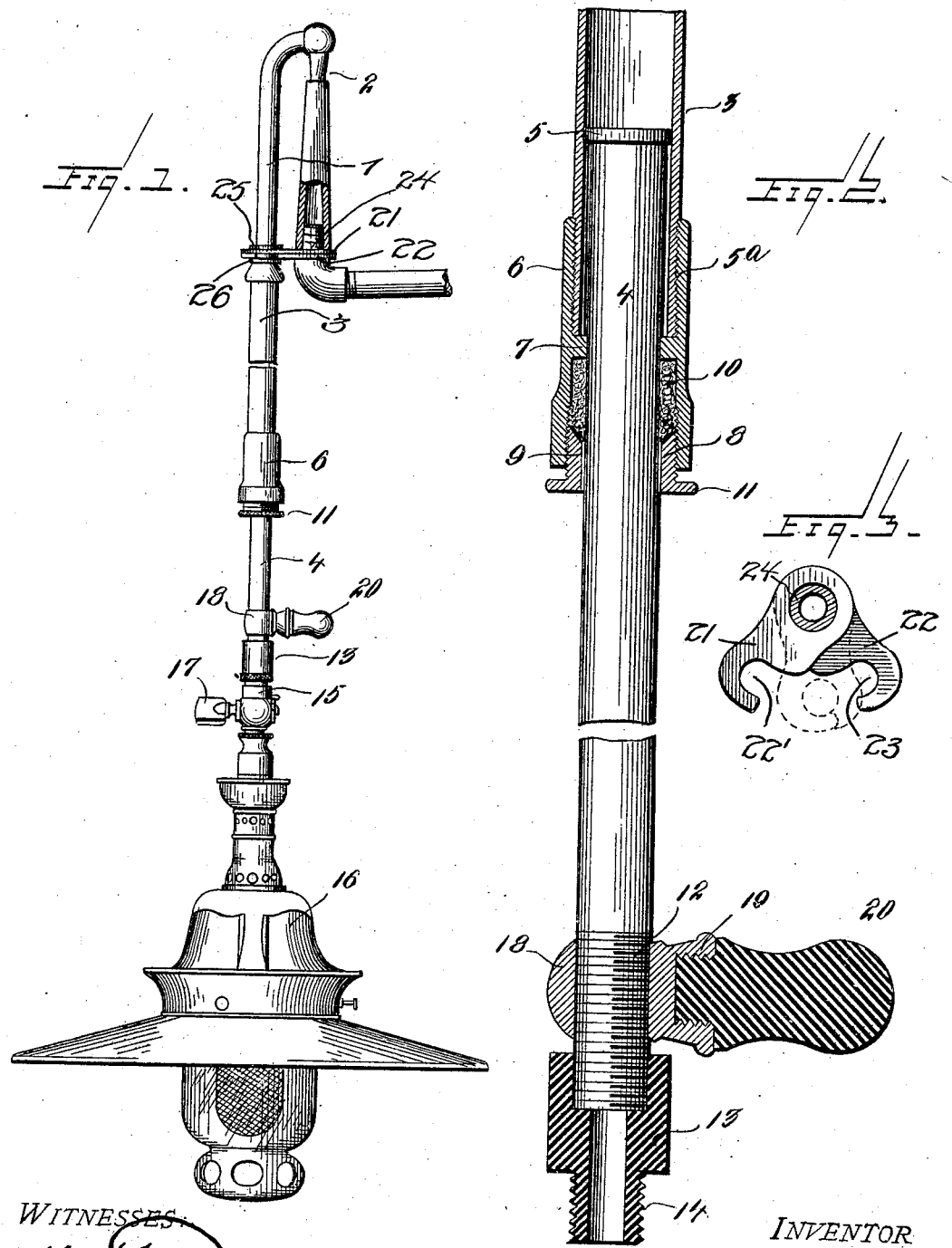

GEORGE WEDDERBURN, OF VIENNA, VIRGINIA.

EXTENSIBLE DROP-LIGHT.

No. 929,060.  Specification of Letters Patent.  Patented July 27, 1909.

Application filed June 18, 1908. Serial No. 439,239.

*To all whom it may concern:*

Be it known that I, GEORGE WEDDERBURN, a citizen of the United States, residing at Vienna, in the county of Fairfax and State of Virginia, have invented certain new and useful Improvements in Extensible Drop-Lights, of which the following is a specification.

This invention relates to certain new and useful improvements in extensible drop light tubes, and it has for its objects among others to provide a simple and cheap yet efficient form of extensible drop light tube and support, applicable to drop lights of the inverted form as well as others, by which the drop light is supported and which is easily extensible, the parts thereof being designed to be frictionally held in any position to which they may be adjusted. I provide for the packing of the joint between the telescopic sections so as to avoid leakage, and then utilize this packing for the further purpose of determining the frictional contact between the parts so that the sliding of the one member may be effected with greater or less ease as may be desired.

Another object of the invention is to prevent undue heating of the tube above the light, and further to provide a manipulating handle of non-conducting material, for an obvious purpose.

Other objects and advantages of the invention will hereinafter appear and the novel features thereof will be particularly pointed out in the appended claims.

The invention, in its preferred form, is clearly illustrated in the accompanying drawings which, with the numerals of reference marked thereon, form a part of this specification and in which—

Figure 1 is an elevation showing the application of my improvement. Fig. 2 is an enlarged detail, partly in elevation and partly in longitudinal section, of those portions of the device in which the invention resides. Fig. 3 is a detail of the clamp with the gooseneck in section.

Like numerals of reference indicate corresponding parts in the different views.

Referring to the drawings 1 designates what is known as the goose-neck having the tapered portion 2 for connection with the gas burner, these parts being of any well known or approved form of construction. The goose-neck 1 is connected in any suitable manner with the tubular portion 3, within which latter is mounted to slide the tubular member 4, having at its upper end the annular collar or enlargement 5, which is a close sliding fit within the tubular member 3, as seen clearly in Fig. 2.

The lower end of the tubular member 3, is exteriorly threaded, as shown at $5^a$, and upon this threaded portion is screwed the upper end of the threaded coupling or member 6, which is provided at substantially midway its length with the annular ring or portion 7, extending within the bore thereof and within which the tubular member 4, is made to fit snugly, as seen in Fig. 2.

The lower end of the coupling or member 6, is interiorly threaded, as seen at 8, to receive the nut 9, which is screwed thereinto, and within this member or coupling 6, below this ring portion 7, is a packing 10, of any suitable compressible material such as rubber sponge or the like which serves not only to prevent leakage of the gas but also by the screwing in of the nut 9, serves to increase the frictional engagement of the tubular member 4, therewith, so as to require greater power to distend the tube. The nut 9, is provided with a milled flange 11, whereby it may be easily turned.

The lower end of the tubular member 4, is exteriorly threaded, as seen at 12, and upon the extreme end there is threaded a coupling or member 13, of some suitable non-conducting material, the lower end of which in turn is screw threaded, as at 14, for connection with the tube 15, of the drop light 16, which latter may be of any suitable type, but as nothing new is herein claimed for the lamp no further description is necessary except to state that 17, is a by-pass valve controlling the flow of gas to the burner for a well known purpose.

Upon the threaded portion 12, of the tubular member 4, there is provided a handle for ease of manipulation of the tubular member. In the present instance it comprises a member 18, threaded upon the said tubular member and provided with a lateral socket 19, interiorly threaded to receive the threads on a handle 20, which is made of any suitable non-conducting material.

As the tube and the operating handle are disposed directly above the light and in the heat zone, the desirability of forming the handle of a suitable non-conductor of heat, and also of making the connection 13, of analogous material, will be obvious. By keeping the tubular member 4, from becoming unduly heated, the life of the packing is materially lengthened. This packing can be readily removed when desired by unscrewing the nut 9, and a new packing substituted.

In practice, the connection is applied, as seen in Fig. 1, and the tubular member 4, manipulated to adjust the light to any desired height by means of the handle 20, the parts being sustained in their adjusted position by frictional engagement of the parts. In the construction shown there are three points of frictional contact, that of the annular member 5, with the inner wall of the tube 3, that of the tubular member 4, with the ring 7, and that of the tubular member 4, with the packing 10, which latter can be, as above stated, compressed to a greater or less extent by manipulation of the nut 9, so that the frictional engagement of the parts may be regulated in accordance with the weight of the lamp so that the parts will remain in whatever position they may be made to assume in affecting the necessary adjustment. The contact of the ring 5, with the ring 7, limits the downward movement of the tubular member 4. When not in use the light may be moved upward to its extreme limit so as to be out of the way as for instance during the day.

It will of course be understood that the members 3, and 4, are of rigid material and not of rubber tubing or the like.

Modifications in detail may be resorted to without departing from the spirit of the invention or sacrificing any of its advantages. For instance, I may sometimes employ in connection with the above construction a clamp for holding the parts against undue movement and separation. It is evident, however, that this clamp may in some instances be dispensed with. As seen in Figs. 1, and 3, it comprises the two members 21, and 22, sleeved upon the bracket 24, for relative pivotal movement thereon, their free ends being curved and provided with the open ended slots 22, and 23, adapted to embrace the goose-neck 1, and when closed thereupon to form a lock, as will be clearly understood by the dotted line position in Fig. 3. These members are disposed between the shoulders or collars 25, and 26, as seen in Fig. 1.

What is claimed as new is:

1. A drop light tube and support comprising telescopic members, means on one end thereof for connection with a gas burner, a non-conducting threaded coupling on the other end thereof for connection with the tube of a drop light for preventing the heat generated by the lamp from affecting the support, and a non-conducting handle and handle-receiving socket adjustably mounted on the end of the tube receiving said threaded coupling.

2. A tubular member, a second tubular member mounted to slide therein and having at one end an annular enlargement for frictional engagement with the inner wall of the outer member and at the other end an exterior thread, a coupling member having between its ends an annular ring extending within the bore thereof and within which the inner tubular member snugly fits, the outer member having threaded engagement with said coupling upon one side of its annular ring, a stuffing box at the other end of said coupling, a non-conducting coupling for connection with a drop light engaged with the threaded end of the inner tubular member, and a screw-threaded member also upon the threaded end of the inner tubular member and having lateral socket, and a non-conducting handle in said socket.

In testimony whereof I affix my signature, in presence of two witnesses.

GEORGE WEDDERBURN.

Witnesses:
E. B. SALISBURY,
W. P. WILLIAMS.